United States Patent
Ichikawa et al.

(10) Patent No.: US 12,538,712 B2
(45) Date of Patent: Jan. 27, 2026

(54) MAGNETORESISTIVE EFFECT ELEMENT AND CRYSTALLIZATION METHOD OF FERROMAGNETIC LAYER

(71) Applicant: TDK CORPORATION, Tokyo (JP)

(72) Inventors: Shinto Ichikawa, Tokyo (JP); Kazuumi Inubushi, Tokyo (JP); Katsuyuki Nakada, Tokyo (JP)

(73) Assignee: TDK CORPORATION, Tokyo (JP)

( * ) Notice: Subject to any disclaimer, the term of this patent is extended or adjusted under 35 U.S.C. 154(b) by 994 days.

(21) Appl. No.: 17/116,236

(22) Filed: Dec. 9, 2020

(65) Prior Publication Data
US 2021/0265562 A1 Aug. 26, 2021

Related U.S. Application Data

(63) Continuation-in-part of application No. PCT/JP2019/049843, filed on Dec. 19, 2019.

(51) Int. Cl.
*H10N 50/10* (2023.01)
*G11B 5/39* (2006.01)
(Continued)

(52) U.S. Cl.
CPC ........... *H10N 50/10* (2023.02); *G11B 5/3906* (2013.01); *G11C 11/161* (2013.01); *H10B 61/00* (2023.02);
(Continued)

(58) Field of Classification Search
CPC ........ H10N 50/10; H10N 50/85; H10N 52/00; H10N 52/80; H10N 52/85; H01F 10/26;
(Continued)

(56) References Cited

U.S. PATENT DOCUMENTS

| | | | |
|---|---|---|---|
| 9,412,399 B2 | 8/2016 | Childress et al. | |
| 2002/0048128 A1* | 4/2002 | Kamiguchi | G11B 5/39 |

(Continued)

FOREIGN PATENT DOCUMENTS

| | | |
|---|---|---|
| JP | 2010-080650 A | 4/2010 |
| JP | 6137577 B2 | 5/2017 |
| JP | 2019-047118 A | 3/2019 |

OTHER PUBLICATIONS

Translation of Apr. 27, 2023 Office Action Issued in Chinese Patent Application No. 201980095846.9.

(Continued)

*Primary Examiner* — Mark W Tornow
*Assistant Examiner* — Priya M Rampersaud
(74) *Attorney, Agent, or Firm* — Oliff PLC

(57) ABSTRACT

A magnetoresistive effect element includes a first ferromagnetic layer, a second ferromagnetic layer, a non-magnetic layer disposed between the first ferromagnetic layer and the second ferromagnetic layer, and an additive-containing layer disposed at any position in a laminating direction, at least one of the first ferromagnetic layer and the second ferromagnetic layer is a Heusler alloy containing at least one of boron and carbon, at least part of which is crystallized, and the additive-containing layer is a non-magnetic layer containing at least one of boron and carbon, and any one element selected from the group made of Ti, V, Cr, Cu, Zn, Zr, Mo, Ru, Pd, Ta, W, Ir, Pt and Au.

14 Claims, 9 Drawing Sheets

(51) Int. Cl.
  *G11C 11/16* (2006.01)
  *H10B 61/00* (2023.01)
  *H10N 50/01* (2023.01)
  *H10N 50/80* (2023.01)
  *H10N 50/85* (2023.01)
(52) U.S. Cl.
  CPC ............. *H10N 50/01* (2023.02); *H10N 50/80* (2023.02); *H10N 50/85* (2023.02)
(58) Field of Classification Search
  CPC ............. H01F 10/3272; H01F 10/3295; H01F 10/3268; G11C 11/161; G11C 11/1675; H10B 61/00; B82Y 25/00; G01R 33/093; G01R 33/098
  See application file for complete search history.

(56) References Cited

U.S. PATENT DOCUMENTS

| | | | |
|---|---|---|---|
| 2006/0050446 A1* | 3/2006 | Ishizone | H10N 50/85 360/324.12 |
| 2006/0262594 A1* | 11/2006 | Fukumoto | H01F 10/3272 365/158 |
| 2010/0072529 A1* | 3/2010 | Marukame | H10D 48/385 257/295 |
| 2010/0244163 A1* | 9/2010 | Daibou | G11C 11/161 257/295 |
| 2013/0034747 A1* | 2/2013 | Taniguchi | G11B 5/657 204/192.15 |
| 2015/0008549 A1 | 1/2015 | Lee et al. | |
| 2015/0129997 A1* | 5/2015 | Tang | G11C 11/161 257/427 |
| 2016/0019917 A1 | 1/2016 | Du et al. | |
| 2017/0062706 A1* | 3/2017 | Yamakawa | H10N 50/01 |
| 2019/0051818 A1* | 2/2019 | Oikawa | H10N 52/00 |
| 2019/0074043 A1 | 3/2019 | Sasaki et al. | |
| 2019/0088857 A1* | 3/2019 | Park | H01F 10/3272 |
| 2020/0075841 A1* | 3/2020 | Watanabe | G11C 11/161 |
| 2020/0091412 A1* | 3/2020 | Lee | H01L 21/67155 |

OTHER PUBLICATIONS

Young-suk Choi et al. "Enhancement of Current-Perpendicular-to-Plane Giant Magnetoresistance by Insertion of Amorphous Ferromagnetic Underlayer in Heusler Alloy-Based Spin-Valve Structures". Applied Physics Express, vol. 10, 2017, pp. 013006-1-013006-4.

Hari S. Goripati et al. "Bi-Quadratic Interlayer Exchange Coupling in Co2MnSi/Ag/Co2MnSi Pseudo Spin-Valve". Journal of Applied Physics, vol. 110, 2011, pp. 123914-1-123914-7.

T. Furubayashi et al. "Structure and Transport Properties of Current-Perpendicular-to-Plane Spin Valves Using Co2FeAl0.5Si0.5 and Co2MnSi Heusler Alloy Electrodes". Journal of Applied Physics, vol. 107, 2010, pp. 113917-1-113917-7.

Taku Iwase et al. "Large Interface Spin-Asymmetry and Magnetoresistance in Fully Epitaxial Co2MnSi/Ag/Co2MnSi Current-Perpendicular-to-Plane Magnetoresistive Devices". Applied Physics Express, vol. 2, 2009, pp. 063003-1-063003-3.

J.W. Jung et al. "Enhancement of Magnetoresistance by Inserting Thin NiAl Layers at the Interfaces in Co2FeGa0.5Ge0.5/Ag/Co2FeGa0.5Ge0.5 Current-Perpendicular-to-Plane Pseudo Spin Valves". Applied Physics Letters, vol. 108, 2016, pp. 102408-1-102408-5.

* cited by examiner

MAGNETORESISTIVE EFFECT ELEMENT AND CRYSTALLIZATION METHOD OF FERROMAGNETIC LAYER

TECHNICAL FIELD

The present invention relates to a magnetoresistive effect element and a crystallization method of a ferromagnetic layer.

BACKGROUND ART

A magnetoresistive effect element is an element having a resistance value in a laminating direction that varies due to a magnetoresistive effect. The magnetoresistive effect element includes two ferromagnetic layers and a non-magnetic layer sandwiched therebetween. The magnetoresistive effect element having a conductor used in the non-magnetic layer is referred to as a giant magnetoresistance (GMR) element, and the magnetoresistive effect element having an insulating layer (a tunnel barrier layer, a barrier layer) used in the non-magnetic layer is referred to as a tunnel magnetoresistance (TMR) element. The magnetoresistive effect element can be applied in various uses of a magnetic sensor, high frequency parts, a magnetic head, a nonvolatile random access memory (MRAM), and the like.

Patent Literature 1 discloses a magnetic sensor including a magnetoresistive effect element having a Heusler alloy used in a ferromagnetic layer. The Heusler alloy has high spin polarizing efficiency, and is expected to increase an output signal of a magnetic sensor. Patent Literature 1 discloses that the Heusler alloy does not easily crystallize unless film forming is performed on a thick backing substrate having a predetermined crystalline property or at a high temperature. Patent Literature 1 discloses that film forming at a high temperature and a thick backing substrate can cause a decrease in output of the magnetic sensor. Patent Literature 1 discloses that output of the magnetic sensor is increased by setting the ferromagnetic layer as a laminated structure of an amorphous layer and a crystalline layer.

CITATION LIST

Patent Literature

[Patent Literature 1]
U.S. Pat. No. 9,412,399

SUMMARY OF INVENTION

Technical Problem

The magnitude of an output signal of a magnetic sensor depends on a magnetoresistive change ratio (MR ratio) of a magnetoresistive effect element. In general, one having higher crystalline properties of ferromagnetic layers sandwiching a non-magnetic layer tends to have a larger MR ratio. In the magnetoresistive effect element disclosed in Patent Literature 1, the ferromagnetic layer in contact with the non-magnetic layer is amorphous, and it is difficult to obtain a sufficiently large MR ratio.

In consideration of the above-mentioned circumstances, the present invention is directed to providing a magnetoresistive effect element capable of realizing a large MR ratio. In addition, the present invention is directed to providing a crystallization method of a ferromagnetic layer used in the magnetoresistive effect element.

Solution to Problem

In order to achieve the aforementioned objects, the present invention provides the following means.

(1) A magnetoresistive effect element according to a first aspect includes a first ferromagnetic layer, a second ferromagnetic layer, a non-magnetic layer disposed between the first ferromagnetic layer and the second ferromagnetic layer, and an additive-containing layer disposed at any position in a laminating direction, wherein at least one of the first ferromagnetic layer and the second ferromagnetic layer is a Heusler alloy containing at least one of boron and carbon, at least part of which is crystallized, and the additive-containing layer is a non-magnetic layer containing: at least one of boron and carbon, and any one element selected from the group consisting of Ti, V, Cr, Cu, Zn, Zr, Mo, Ru, Pd, Ta, W, Ir, Pt and Au.

(2) In the magnetoresistive effect element according to the aspect, the additive-containing layer may be two layers, and the two additive-containing layers may sandwich the first ferromagnetic layer and the second ferromagnetic layer.

(3) In the magnetoresistive effect element according to the aspect, the additive-containing layer may be in contact with at least one of the first ferromagnetic layer and the second ferromagnetic layer.

(4) In the first ferromagnetic layer or the second ferromagnetic layer of the magnetoresistive effect element according to the aspect, a concentration of boron or carbon in a first surface close to the non-magnetic layer may be lower than a concentration of boron or carbon in a second surface far from the non-magnetic layer.

(5) In the first ferromagnetic layer or the second ferromagnetic layer of the magnetoresistive effect element according to the aspect, a concentration of boron or carbon may be lower as it becomes closer to the non-magnetic layer.

(6) In the magnetoresistive effect element according to the aspect, the additive-containing layer may be a metal or an alloy containing at least one of boron and carbon, and containing at least one element selected from the group consisting of Ti, Ru and Ta.

(7) In the magnetoresistive effect element according to the aspect, in the Heusler alloy, a compound expressed by $Co_\alpha Y_\beta Z_\gamma$ may contain at least one of boron and carbon, Y may be a transition metal element or a precious metal element of the Co, Fe, Ni, Cu, Mn, V, Cr or Ti group, Z may be a typical element from group III to group V, a may be 1 or 2, and $\beta+\gamma>2$ may be satisfied.

(8) In the magnetoresistive effect element according to the aspect, the Heusler alloy may be a compound expressed by $(Co_2Fe_\beta Z_\gamma)_{1-\delta}B_\delta$, Z may be a typical element from group III to group V, and $\beta+\gamma\geq 2.3$, $\beta<\gamma$, $0.5<\beta<1.9$, $1.0<\gamma<2.0$, and $0.1\leq\delta\leq 0.3$ may be satisfied.

(9) In the magnetoresistive effect element according to the aspect, the compound may satisfy $0.1\leq\delta\leq 0.25$.

(10) In the magnetoresistive effect element according to the aspect, the additive-containing layer may be discontinuous in an in-plane direction crossing the laminating direction.

(11) In the magnetoresistive effect element according to the aspect, the non-magnetic layer may be a metal or an alloy containing any one element selected from the group consisting of Cu, Au, Ag, Cr and Al.

(12) The magnetoresistive effect element according to the aspect may further include an intermediate layer, wherein the intermediate layer is disposed at least one of between the first ferromagnetic layer and the non-magnetic layer and between the second ferromagnetic layer and the non-magnetic layer, the intermediate layer is an alloy expressed by Ni or $Ni_\varepsilon Al_{1-\varepsilon}$, and $0.5 \leq \varepsilon < 1.0$.

(13) In the magnetoresistive effect element according to the aspect, a thickness of the intermediate layer may be greater than 0 nm, and equal to or smaller than 0.63 nm.

(14) The magnetoresistive effect element according to the aspect may further have a substrate, wherein the substrate is a backing on which the first ferromagnetic layer, the second ferromagnetic layer, the non-magnetic layer and the additive-containing layer are laminated, and the substrate is amorphous.

(15) A crystallization method of a ferromagnetic layer according to a second aspect includes a process of laminating an absorber layer containing any one element selected from the group consisting of Ti, V, Cr, Cu, Zn, Zr, Mo, Ru, Pd, Ta, W, Ir, Pt and Au, and a ferromagnetic layer containing an amorphous Heusler alloy containing at least one of boron and carbon; and a process of heating the absorber layer and the ferromagnetic layer.

Advantageous Effects of Invention

A magnetoresistive effect element according to the present invention shows a large MR ratio. In addition, according to a crystallization method of a ferromagnetic layer according to the present invention, a Heusler alloy can be crystallized at a low temperature regardless of a backing substrate.

DESCRIPTION OF EMBODIMENTS

Figure 1:
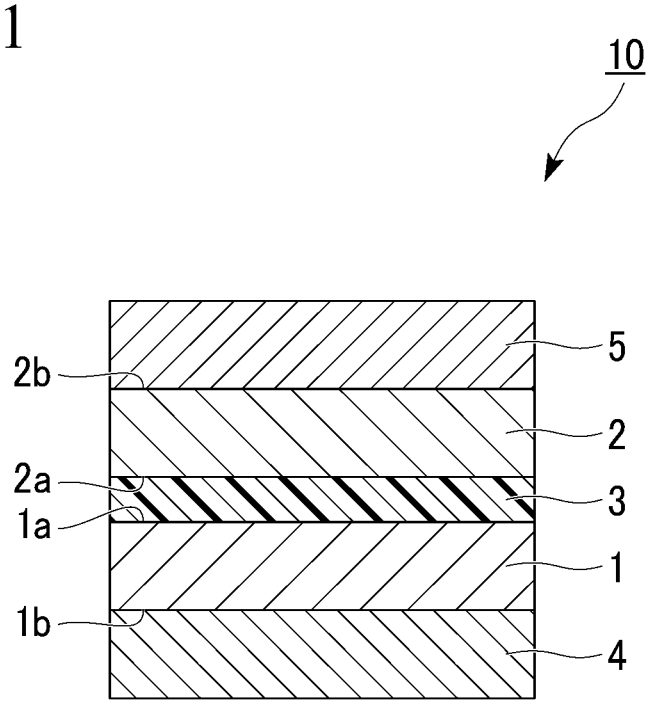
FIG. 1 is a cross-sectional view of a magnetoresistive effect element according to a first embodiment.

Hereinafter, an embodiment of the present invention will be described with reference to the accompanying drawings in detail. In the drawings in the following description, in order to make features of the embodiment easier to understand, featured parts may be enlarged for convenience, and dimensional ratios of components may differ from the actual ones. Materials, dimensions, and the like exemplified in the following description are examples, and the present invention is not limited thereto but may be appropriately modified and performed without departing from the spirit of the present invention.

First Embodiment

FIG. 1 is a cross-sectional view of a magnetoresistive effect element according to a first embodiment. First, directions will be defined. A direction in which layers are laminated may be referred to as a laminating direction. In addition, a direction crossing the laminating direction and in which the layers extend may be referred to as an in-plane direction.

A magnetoresistive effect element 10 shown in FIG. 1 includes a first ferromagnetic layer 1, a second ferromagnetic layer 2, a non-magnetic layer 3, and additive-containing layers 4 and 5. The non-magnetic layer 3 is disposed between the first ferromagnetic layer 1 and the second ferromagnetic layer 2. The additive-containing layers 4 and 5 sandwich the first ferromagnetic layer 1, the non-magnetic layer 3 and the second ferromagnetic layer 2 in the laminating direction.

The magnetoresistive effect element 10 outputs a variation in a relative angle of magnetization of the first ferromagnetic layer 1 and magnetization of the second ferromagnetic layer 2 as a variation in a resistance value. The magnetization of the second ferromagnetic layer 2 moves more easily than, for example, the magnetization of the first ferromagnetic layer 1. When a predetermined external force is added, an orientation of the magnetization of the first ferromagnetic layer 1 does not vary (is fixed), and an orientation of the magnetization of the second ferromagnetic layer 2 varies. Since the orientation of the magnetization of the second ferromagnetic layer 2 with respect to the orientation of the magnetization of the first ferromagnetic layer 1 varies, a resistance value of the magnetoresistive effect element 10 varies. In this case, the first ferromagnetic layer 1 may be referred to as a magnetization-fixed layer, and the second ferromagnetic layer 2 may be referred to as a magnetization free layer. While the first ferromagnetic layer 1 serving as the magnetization-fixed layer and the second ferromagnetic layer 2 serving as the magnetization free layer will be described below, the relationship may be reversed.

A difference in mobility of the magnetization of the first ferromagnetic layer 1 and the magnetization of the second ferromagnetic layer 2 when a predetermined external force is applied is generated due to a discrepancy in coercive force of the first ferromagnetic layer 1 and the second ferromagnetic layer 2. For example, when the thickness of the second ferromagnetic layer 2 is smaller than that of the first ferromagnetic layer 1, the coercive force of the second ferromagnetic layer 2 is smaller than that of the first ferromagnetic layer 1. In addition, for example, an anti-ferromagnetic layer may be provided on a surface of the first ferromagnetic layer 1 opposite to the non-magnetic layer 3 via a spacer layer. The first ferromagnetic layer 1, the spacer layer and the anti-ferromagnetic layer constitute a synthetic anti-ferromagnetic structure (SAF structure). The synthetic anti-ferromagnetic structure is constituted by two magnetic layers that sandwich the spacer layer. Since the first ferromagnetic layer 1 and the anti-ferromagnetic layer are anti-ferromagnetically coupled to each other, the coercive force of the first ferromagnetic layer 1 is increased in comparison with the case in which the anti-ferromagnetic layer is not provided. The anti-ferromagnetic layer is formed of, for example, IrMn, PtMn, or the like. The spacer layer contains at least one selected from the group consisting of, for example, Ru, Ir and Rh.

The first ferromagnetic layer 1 and the second ferromagnetic layer 2 include ferromagnetic bodies. The first ferromagnetic layer 1 and the second ferromagnetic layer 2 are formed of a Heusler alloy containing at least one of boron and carbon, at least part of which is crystallized.

The Heusler alloy is an intermetallic compound having a chemical composition of XYZ or $X_2YZ$. A ferromagnetic Heusler alloy expressed by $X_2YZ$ is referred to as a full Heusler alloy, and a ferromagnetic Heusler alloy expressed by XYZ is referred to as a half Heusler alloy. The half Heusler alloy is an alloy in which some of atoms of an X side of the full Heusler alloy become a vacant lattice. Both are typically intermetallic compounds based on a bcc structure.

X is a transition metal element or a precious metal element of the Co, Fe, Ni, or Cu group on the periodic table, Y is a transition metal of the Mn, V, Cr or Ti group or an elemental species of X, and Z is a typical element from group III to group V. The full Heusler alloy is, for example, $Co_2FeSi$, $Co_2FeGe$, $Co_2FeGa$, $Co_2FeAl$, $Co_2FeGe_xGa_{1-x}$, $Co_2MnGe_xGa_{1-x}$, $Co_2MnSi$, $Co_2MnGe$, $Co_2MnGa$, $Co_2MnSn$, $Co_2MnAl$, $Co_2CrAl$, $Co_2VAl$, $Co_2Mn_{1-a}Fe_aAl_bSi_{1-b}$, or the like. The half Heusler alloy is, for example, NiMnSe, NiMnTe, NiMnSb, PtMnSb, PdMnSb, CoFeSb, NiFeSb, RhMnSb, CoMnSb, IrMnSb, NiCrSb, or the like.

Figure 2A:
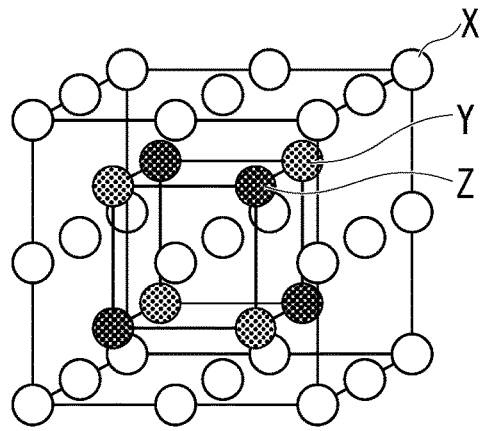
FIGS. 2A-2F are views showing a crystalline structure of a Heusler alloy.
Figure 2D:
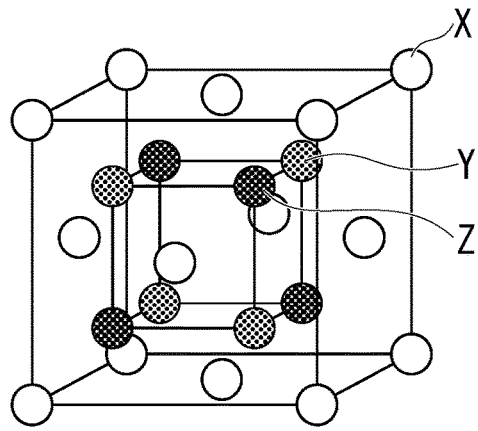
Figure 2B:
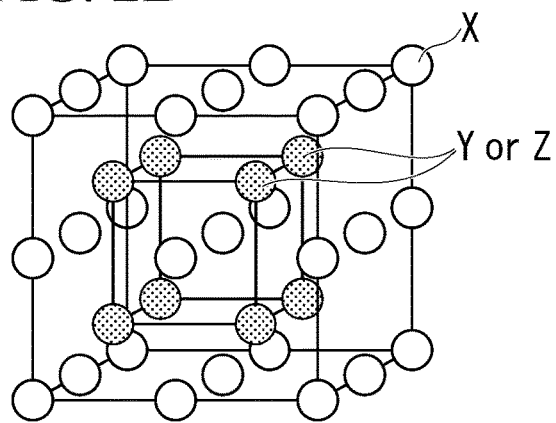
Figure 2E:
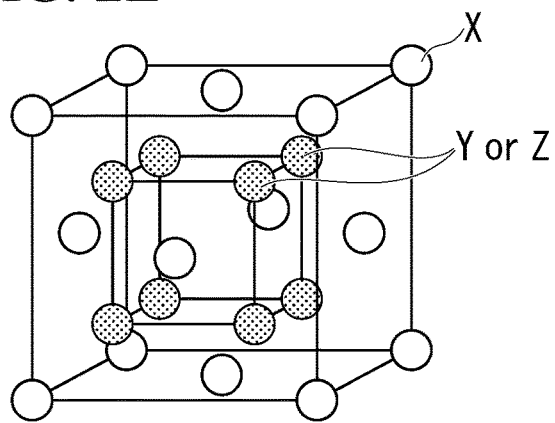
Figure 2C:
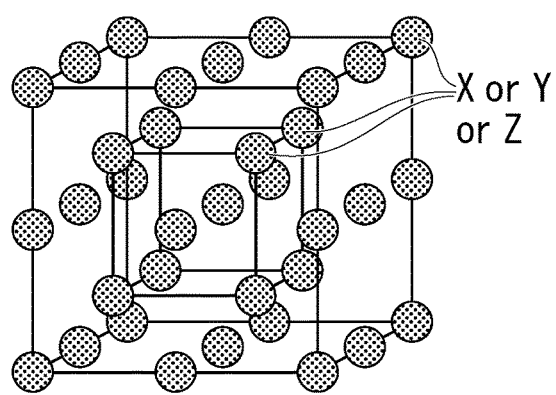
Figure 2F:
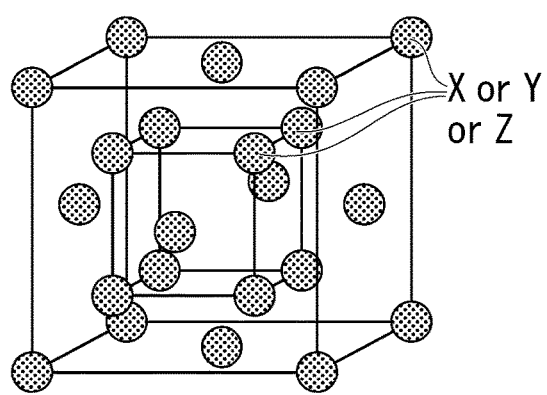

In the first ferromagnetic layer 1 and the second ferromagnetic layer 2, at least part of the Heusler alloy is crystallized. In the first ferromagnetic layer 1 and the second ferromagnetic layer 2, for example, the Heusler alloy may be crystallized entirely. FIGS. 2A-2F show examples of a crystalline structure of the Heusler alloy. FIGS. 2A to 2C are examples of a crystalline structure of the full Heusler alloy. FIGS. 2D to 2F are examples of a crystalline structure of the half Heusler alloy.

FIG. 2A is referred to as an $L2_1$ structure. In the $L2_1$ structure, elements entering an X site, elements entering a Y site and elements entering a Z site are fixed. FIG. 2B is referred to as a B2 structure derived from the $L2_1$ structure. In the B2 structure, elements entering a Y site and elements entering a Z site are mixed, and elements entering an X site are fixed. FIG. 2C is referred to as an A2 structure derived from the $L2_1$ structure. In the A2 structure, elements entering an X site, elements entering a Y site and elements entering a Z site are mixed.

FIG. 2D is referred to as a $C1_b$ structure. In the $C1_b$ structure, elements entering an X site, elements entering a Y site and elements entering a Z site are fixed. FIG. 2E is referred to as a B2 structure derived from the $C1_b$ structure. In the B2 structure, elements entering a Y site and elements entering a Z site are mixed, and elements entering an X site are fixed. FIG. 2F is referred to as an A2 structure derived from the $C1_b$ structure. In the A2 structure, elements entering an X site, elements entering a Y site and elements entering a Z site are mixed.

In the full Heusler alloy, a crystalline property is higher in the order of the $L2_1$ structure>the B2 structure>the A2 structure, and in the half Heusler alloy, a crystalline property is higher in the order of the $C1_b$ structure>the B2 structure>the A2 structure. These crystalline structures have a discrepancy in goodness of the crystalline property, but they are all crystalline. Accordingly, the first ferromagnetic layer 1 and the second ferromagnetic layer 2 have, for example, parts having any of the above-mentioned crystalline structures.

Whether the Heusler alloy is crystallized can be determined according to a transmission electron microscope (TEM) image (for example, a high-angle scattered annular dark-field scanning transmission microscope image: a HAADF-STEM image) or an electron beam diffraction image using a transmission electron beam. When the Heusler alloy is crystallized, for example, a state in which atoms are arranged regularly can be confirmed according to the HAADF-STEM image. More specifically, a spot derived from the crystalline structure of the Heusler alloy appears in a Fourier transform image of the HAADF-STEM image. In addition, when the Heusler alloy is crystallized, a diffraction spot from at least one surface of a (001) surface, a (002) surface, a (110) surface, and a (111) surface can be confirmed in the electron beam diffraction image. When the crystallization can be confirmed by at least one means, it can be said that at least part of the Heusler alloy is crystallized.

Composition analysis of the layers that constitute the magnetoresistive effect element can be performed using energy dispersive X-ray analysis (EDS). In addition, when the EDS ray analysis is performed, for example, it is possible to check a composition distribution in a film thickness direction of materials.

In addition, the first ferromagnetic layer 1 and the second ferromagnetic layer 2 contain at least one of boron and carbon. The boron or carbon may be replaced with any one atom that constitutes a crystalline structure or may intrude into the crystalline structure.

The first ferromagnetic layer 1 and the second ferromagnetic layer 2 are, for example, a Heusler alloy in which a compound expressed by $Co_\alpha Y_\beta Z_\gamma$ contains at least one of boron and carbon. Y is a transition metal element or a precious metal element of the Co, Fe, Ni, Cu, Mn, V, Cr or Ti group, and Z is a typical element from group III to group V. $\alpha$ is 1 or 2. When $\alpha$ is 1, the alloy is a half Heusler alloy, and when $\alpha$ is 2, the alloy is a full Heusler alloy. In addition, $\beta$ and $\gamma$ satisfy $\beta+\gamma>2$. In either case of the half Heusler alloy or the full Heusler alloy, $\beta$ and $\gamma$ in a stoichiometric composition satisfy $\beta+\gamma=2$. That is, a sum of $\beta$ and $\gamma$ is greater than their sum in the stoichiometric composition.

When $\beta+\gamma>2$ is satisfied, a composition ratio ($\alpha$) of Co is relatively smaller than a composition ratio ($\beta+\gamma$) of the elements of the Y site and the Z site. As a result, it is possible to avoid an anti-site where the elements of the Y site are replaced with the elements of the X side (a side into which Co enters). The anti-site fluctuates a fermi level of the Heusler alloy. When the fermi level is fluctuated, a half metal property of the Heusler alloy decreases, and a spin polarizing efficiency decreases. A decrease in spin polarizing efficiency causes a decrease in the MR ratio of the magnetoresistive effect element 10.

The first ferromagnetic layer 1 and the second ferromagnetic layer 2 are formed of, for example, a Heusler alloy expressed by $(Co_2Fe_\beta Z_\gamma)_{1-\delta}B_\delta$. Z is a typical element from group III to group V. A compositional formula satisfies $\beta+\gamma\geq 2.3$, $\beta<\gamma$, $0.5<\beta<1.9$, $1.0<\gamma<2.0$, and $0.1\leq\delta\leq 0.3$. In addition, $\delta$ in the compositional formula preferably satisfies $0.1\leq\delta\leq 0.25$ or more preferably satisfies $0.15\leq\delta\leq 0.2$. In addition, $\beta+\gamma$ in the compositional formula preferably satisfies $2.3\leq\beta+\gamma\leq 2.9$ or more preferably satisfies $2.5\leq\beta+\gamma\leq 2.7$. When the Heusler alloy satisfies the relationship, the spin polarizing efficiency of the Heusler alloy is improved, and the MR ratio of the magnetoresistive effect element 10 is improved.

The amount of boron and carbon contained in the first ferromagnetic layer 1 and the second ferromagnetic layer 2 is preferably equal to or smaller than a predetermined amount. The boron and carbon may disturb a crystalline structure of the first ferromagnetic layer 1 or the second ferromagnetic layer 2. The amount of boron and carbon contained in the first ferromagnetic layer 1 and the second ferromagnetic layer 2 is, for example, 5 atm % or more and 35 atm % or less, or preferably 15 atm % or more and 25 atm % or less.

The first ferromagnetic layer 1 and the second ferromagnetic layer 2 sandwich the non-magnetic layer 3. A surface of the first ferromagnetic layer 1 close to the non-magnetic layer 3 is referred to as a first surface 1a, and a surface of the first ferromagnetic layer 1 far from the non-magnetic layer 3 is referred to as a second surface 1b. A surface of the second ferromagnetic layer 2 close to the non-magnetic layer 3 is referred to as a first surface 2a, and a surface of the second ferromagnetic layer 2 far from the non-magnetic layer 3 is referred to as a second surface 2b.

A concentration of the boron or carbon is lower, for example, in the first surface 1a than in the second surface 1b, and lower, for example, in the first surface 2a than in the second surface 2b. As described above, the boron and carbon may disturb a crystalline structure of the first ferromagnetic layer 1 or the second ferromagnetic layer 2. As a crystalline property of the surface in contact with the non-magnetic layer 3 is increased, the MR ratio of the magnetoresistive effect element 10 is improved. When the concentration of the boron or carbon is lower in the first surfaces 1a and 2a than in the second surfaces 1b and 2b, the crystalline property of the first surfaces 1a and 2a is increased, and the MR ratio of the magnetoresistive effect element 10 is improved. The concentration of the boron or carbon may decrease, for example, from the second surface 1b toward the first surface 1a, or may decrease, for example, from the second surface 2b toward the first surface 2a.

The non-magnetic layer 3 is formed of, for example, a non-magnetic metal. The non-magnetic layer 3 is, for example, a metal or an alloy containing any one element selected from the group consisting of Cu, Au, Ag, Al and Cr. The non-magnetic layer 3 contains, for example, any one element selected from the group consisting of Cu, Au, Ag, Al and Cr as a main component. Being the main component means that a ratio of Cu, Au, Ag, Al and Cr in the compositional formula is 50% or more. The non-magnetic layer 3 preferably contains Ag, and preferably contains Ag as a main component. Since Ag has a large spin diffusion length, the magnetoresistive effect element 10 using Ag shows a large MR ratio.

The non-magnetic layer 3 has a thickness within a range of, for example, 1 nm or more and 10 nm or less. The non-magnetic layer 3 inhibits magnetic coupling between the first ferromagnetic layer 1 and the second ferromagnetic layer 2.

The non-magnetic layer 3 may be an insulating material or a semiconductor. The non-magnetic insulating material is, for example, $Al_2O_3$, $SiO_2$, MgO, $MgAl_2O_4$, or a material in which some of Al, Si and Mg of these is replaced with Zn, Be, or the like. These materials have a large band gap and are excellent in insulation. When the non-magnetic layer 3 is formed of a non-magnetic insulating material, the non-magnetic layer 3 is a tunnel barrier layer. The non-magnetic semiconductor is, for example, Si, Ge, $CuInSe_2$, $CuGaSe_2$, $Cu(In,Ga)Se_2$, or the like.

The additive-containing layers 4 and 5 are non-magnetic layers. Each of the additive-containing layers 4 and 5 contains at least one of boron and carbon, and any one element selected from the group consisting of Ti, V, Cr, Cu, Zn, Zr, Mo, Ru, Pd, Ta, W, Ir, Pt and Au. Hereinafter, any one element selected from the group consisting of Ti, V, Cr, Cu, Zn, Zr, Mo, Ru, Pd, Ta, W, Ir, Pt and Au is referred to as a first element. The additive-containing layers 4 and 5 are obtained by, for example, adding boron or carbon to a metal or an alloy constituted by the first element. The additive-containing layers 4 and 5 preferably contain any one element selected from the group consisting of Ti, Ru and Ta from the first elements. The additive-containing layers 4 and 5 are obtained by, for example, adding boron or carbon to a metal or an alloy containing any one element selected from the group consisting of Ti, Ru and Ta.

The first elements contained in the additive-containing layers 4 and 5 have a property of attracting boron and carbon. This property is particularly strong in Ti, Ru and Ta among the first elements. While it will be described later in detail, since the additive-containing layers 4 and 5 contain the first elements, crystallization of the first ferromagnetic layer 1 and the second ferromagnetic layer 2 can be accelerated by attracting at least one of the boron and the carbon to the first element upon heating.

In FIG. 1, the additive-containing layer 4 comes in contact with the first ferromagnetic layer 1, and the additive-containing layer 5 comes in contact with the second ferromagnetic layer 2. When the additive-containing layer 4 comes in direct contact with the first ferromagnetic layer 1, diffusion of boron or carbon from the first ferromagnetic layer 1 to the additive-containing layer 4 is accelerated, and crystallization of the first ferromagnetic layer 1 is accelerated. Even when the additive-containing layer 5 comes in direct contact with the second ferromagnetic layer 2, crystallization of the second ferromagnetic layer 2 is similarly accelerated.

Figure 3:
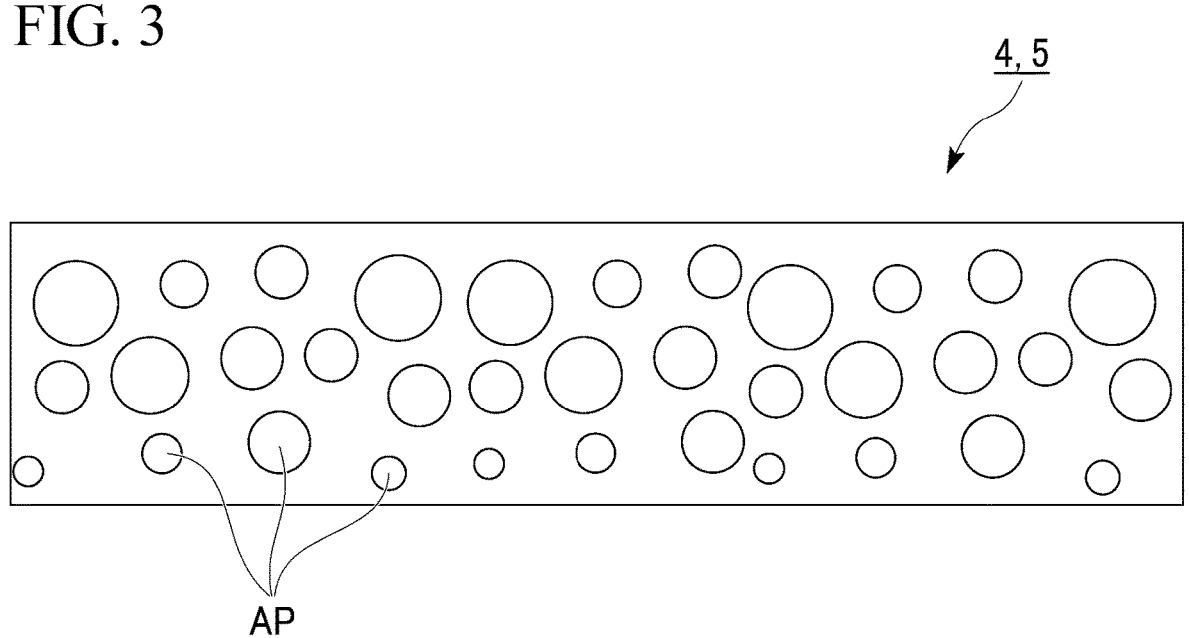
FIG. 3 is a plan view of an example of an additive-containing layer.

In addition, the additive-containing layers 4 and 5 may be discontinuous in the in-plane direction. Being discontinuous in the in-plane direction means that the layer is not a regularly uniform layer. FIG. 3 is an example of the additive-containing layers 4 and 5. As shown in FIG. 3, for example, when the additive-containing layers 4 and 5 have openings AP in parts in the plane, the case in which regions consisting of the first elements are scattered in the plane corresponds to the case in which the additive-containing layers 4 and 5 are discontinuous in the in-plane direction. Another ferromagnetic layer may be laminated at a position where the additive-containing layers 4 and 5 sandwich the first ferromagnetic layer 1 or the second ferromagnetic layer 2. In this case, since the additive-containing layers 4 and 5 are discontinuous in the in-plane direction, the first ferromagnetic layer 1 or the second ferromagnetic layer 2 comes in direct contact with another ferromagnetic layer, and magnetic coupling therebetween is strengthened.

Next, a method of manufacturing the magnetoresistive effect element 10 will be described. The method of manufacturing the magnetoresistive effect element 10 includes a film forming process of each layer, and an annealing process after film forming. In the annealing process, an amorphous Heusler alloy is crystallized.

Figure 4:
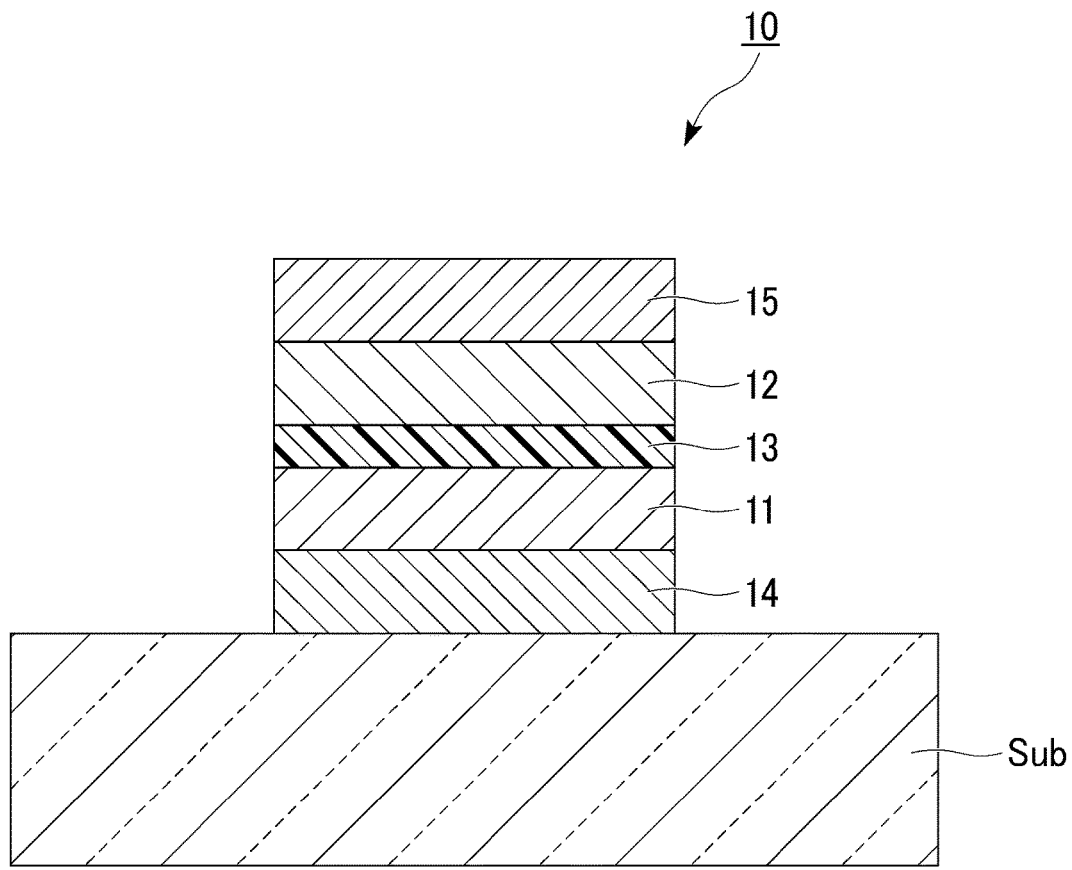
FIG. 4 is a cross-sectional view for describing a method of manufacturing the magnetoresistive effect element according to the first embodiment.

FIG. 4 is a schematic diagram for describing the method of manufacturing the magnetoresistive effect element 10 according to the first embodiment. First, a substrate Sub that is a film-forming backing is prepared. The substrate Sub may have a crystalline property or may be amorphous. As the substrate having a crystalline property, for example, a metal oxide single crystal, a silicon single crystal, or a sapphire single crystal is provided. As the amorphous substrate, for example, a thermal oxide film-attached silicon single crystal, glass, ceramic, or quartz is provided.

Next, an absorber layer 14, a ferromagnetic layer 11, a non-magnetic layer 13, a ferromagnetic layer 12, and an absorber layer 15 are sequentially laminated on the substrate Sub. These layers are film-formed through, for example, a sputtering method.

The absorber layers 14 and 15 contain any one element (a first element) selected from the group consisting of Ti, V, Cr, Cu, Zn, Zr, Mo, Ru, Pd, Ta, W, Ir, Pt and Au. The absorber layers 14 and 15 are formed of, for example, a metal or an alloy of any one element selected from the group consisting of Ti, V, Cr, Cu, Zn, Zr, Mo, Ru, Pd, Ta, W, Ir, Pt and Au.

The ferromagnetic layers 11 and 12 contain an amorphous Heusler alloy containing at least one of boron and carbon. The ferromagnetic layers 11 and 12 are, for example, an amorphous Heusler alloy containing at least one of boron and carbon. The crystals are easily affected by the backing, and when the substrate is amorphous, the film-formed Heusler alloy is amorphous. In addition, when the ferromagnetic layers 11 and 12 contain boron or carbon, the Heusler alloy tends to be amorphous after film forming.

The non-magnetic layer 13 is formed of the same material as the above-mentioned non-magnetic layer 3.

Next, the laminated body laminated on the substrate Sub is annealed. An annealing temperature is, for example, 300° C. or less, and for example, 250° C. or more and 300° C. or less.

When the laminated body is annealed, the first element contained in the absorber layers 14 and 15 attracts boron and carbon contained in the ferromagnetic layers 11 and 12. The boron and carbon are attracted to the first element, and diffused from the ferromagnetic layers 11 and 12 toward the absorber layers 14 and 15. The boron and carbon are moved through the ferromagnetic layers 11 and 12 when diffused toward the absorber layers 14 and 15, and atoms in the ferromagnetic layers 11 and 12 are mixed. The mixed atoms are rearranged in the ferromagnetic layers 11 and 12, and the ferromagnetic layers 11 and 12 are crystallized. That is, diffusion of boron or carbon accelerates rearrangement of the atoms in the ferromagnetic layers 11 and 12, and crystallization of the ferromagnetic layers 11 and 12 is accelerated.

Since the laminated body is annealed, the absorber layers 14 and 15 contains at least one of the boron and the carbon, and becomes the additive-containing layers 4 and 5. The ferromagnetic layers 11 and 12 become the first ferromagnetic layer 1 and the second ferromagnetic layer 2 because at least part of the Heusler alloy is crystallized due to diffusion of the boron or the carbon and the diffused boron or carbon is remained. In addition, the non-magnetic layer 13 becomes the non-magnetic layer 3. As a result, the magnetoresistive effect element 10 shown in FIG. 1 is obtained.

As described above, when the method of manufacturing the magnetoresistive effect element 10 according to the embodiment is used, the Heusler alloy can be crystallized regardless of the crystalline structure of the backing. Herein, while the method is introduced as one of processes of the method of manufacturing the magnetoresistive effect element 10, the method can also be applied to a crystallization method of a ferromagnetic layer of a single body. For example, the amorphous ferromagnetic layer is crystallized by laminating the absorber layer containing the first element and the ferromagnetic layer containing the amorphous Heusler alloy containing at least one of the boron and carbon, and heating the absorber layer and the ferromagnetic layer.

In the method of manufacturing the magnetoresistive effect element 10 according to the embodiment, the ferromagnetic layer is crystallized at a low temperature that is 300° C. or less. If the temperature is 300° C. or less, for example, even when annealing is performed after another component of a magnetic head is fabricated, bad influence on the other component can be reduced. Accordingly, timing when annealing is performed is not limited, and an element such as a magnetic head or the like can be easily manufactured.

In addition, the boron and carbon are diffused in a direction in which they are separated from the non-magnetic layer 13 during annealing. The boron or carbon contained in the non-magnetic layer 3 cause a decrease in MR ratio of the magnetoresistive effect element 10. Since the boron and carbon are attracted toward the ferromagnetic layers 11 and 12, it is possible to prevent the boron or carbon from being contained in the non-magnetic layer 3.

In addition, in the magnetoresistive effect element 10 according to the embodiment, first ferromagnetic layer 1 and the second ferromagnetic layer 2 that sandwich the non-magnetic layer 3 are crystallized. For this reason, the first ferromagnetic layer 1 and the second ferromagnetic layer 2 show a high spin polarizing efficiency. As a result, the magnetoresistive effect element 10 according to the embodiment shows a high MR ratio.

Hereinabove, while the embodiment of the present invention has been described in detail with reference to the accompanying drawings, components according to the embodiment and combinations thereof are exemplarily provided, and additions, omissions, substitutions and other changes may be made without departing from the spirit of the present invention.

For example, any one of the first ferromagnetic layer 1 and the second ferromagnetic layer 2 has at least one of the boron and carbon, and it may be the Heusler alloy, at least part of which is crystallized. In this case, the remaining one ferromagnetic layer contains, for example, a metal selected from the group consisting of Cr, Mn, Co, Fe and Ni, an alloy containing one or more metal of these, and an alloy containing at least one element of these metals and B, C and N. For example, a composition of the remaining one ferromagnetic layer is Co-Fe or Co-Fe-B.

In addition, for example, the magnetoresistive effect element 10 may have a layer other than the first ferromagnetic layer 1, the second ferromagnetic layer 2, the non-magnetic layer 3 and the additive-containing layers 4 and 5.

Figure 5:
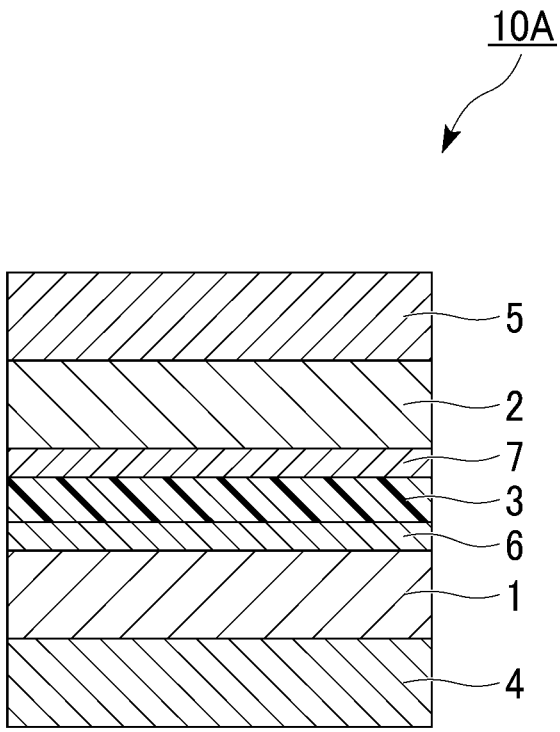
FIG. 5 is a cross-sectional view of a magnetoresistive effect element according to a first variant.
Figure 5:
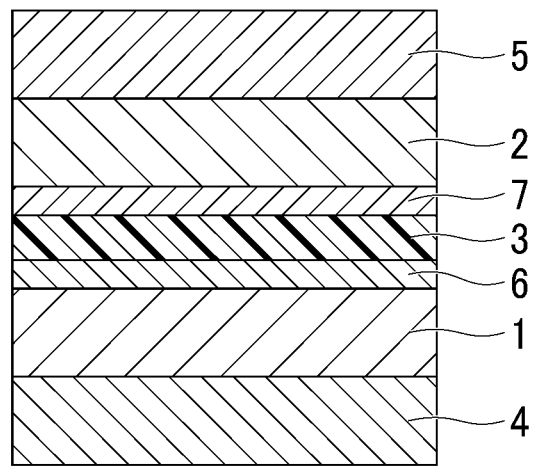

FIG. 5 is a cross-sectional view of a magnetoresistive effect element 10A according to a first variant of the first embodiment. The magnetoresistive effect element 10A is distinguished from the magnetoresistive effect element 10 in that intermediate layers 6 and 7 are provided. In the magnetoresistive effect element 10A, the same components as those of the magnetoresistive effect element 10 are designated by the same reference signs.

The intermediate layer 6 is disposed between the first ferromagnetic layer 1 and the non-magnetic layer 3. The intermediate layer 7 is disposed between the second ferromagnetic layer 2 and the non-magnetic layer 3. In FIG. 5, while the example in which the intermediate layers 6 and 7 are two layers has been proposed, any one layer may be provided.

Each of the intermediate layers 6 and 7 contains, for example, a Ni or NiAl alloy. Each of the intermediate layers 6 and 7 is an alloy expressed by, for example, Ni or $Ni_\varepsilon Al_{1-\varepsilon}$. $\varepsilon$ is $0.5 \le \varepsilon \le 1.0$. The intermediate layer 6 attenuates lattice mismatch between the first ferromagnetic layer 1 and the non-magnetic layer 3, and the intermediate layer 7 attenuates lattice mismatch between the second ferromagnetic layer 2 and the non-magnetic layer 3. Since a lattice mismatch property between the layers is attenuated by the intermediate layers 6 and 7, the magnetoresistive effect element 10A has a high MR ratio.

A thickness t of the intermediate layers 6 and 7 is, for example, 0 nm<t≤0.63 nm, preferably 0.1 nm≤t≤0.6 3 nm. When the thickness of the intermediate layers 6 and 7 is great, many spins may be scattered in the intermediate layers 6 and 7.

The intermediate layers 6 and 7 can be film-formed through simultaneous sputtering of, for example, Ni and Al.

Figure 6:
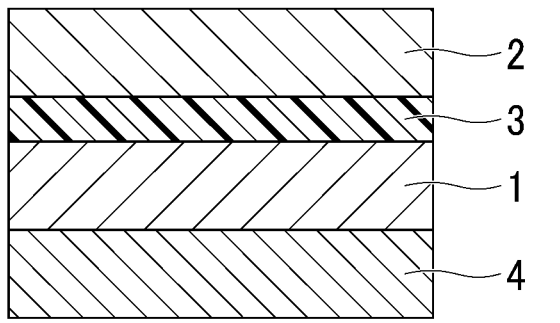
FIG. 6 is a cross-sectional view of a magnetoresistive effect element according to a second variant.
Figure 6:
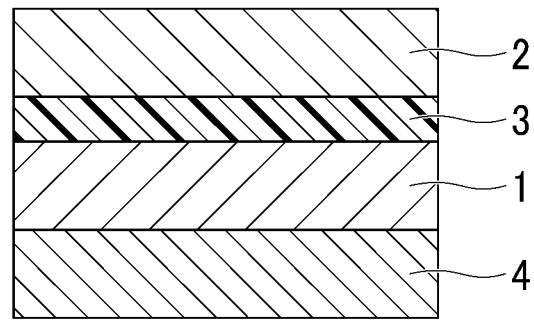

In addition, for example, like the magnetoresistive effect element 10B shown in FIG. 6, an additive-containing layer may be only one layer. In FIG. 6, while the example in which the magnetoresistive effect element 10B has only the additive-containing layer 4 adjacent to the first ferromagnetic layer 1 has been shown, the magnetoresistive effect element may have only the additive-containing layer 5 adjacent to the second ferromagnetic layer 2.

The above-mentioned magnetoresistive effect element 10, 10A or 10B may be used for various uses. The magnetoresistive effect element 10, 10A or 10B can be applied to, for example, a magnetic head, a magnetic sensor, a magnetic memory, a high pass filter, or the like.

Next, application examples of the magnetoresistive effect element according to the embodiment will be described. Further, in the following application examples, while the magnetoresistive effect element 10 is used as the magnetoresistive effect element, the magnetoresistive effect element is not limited thereto.

Figure 7:
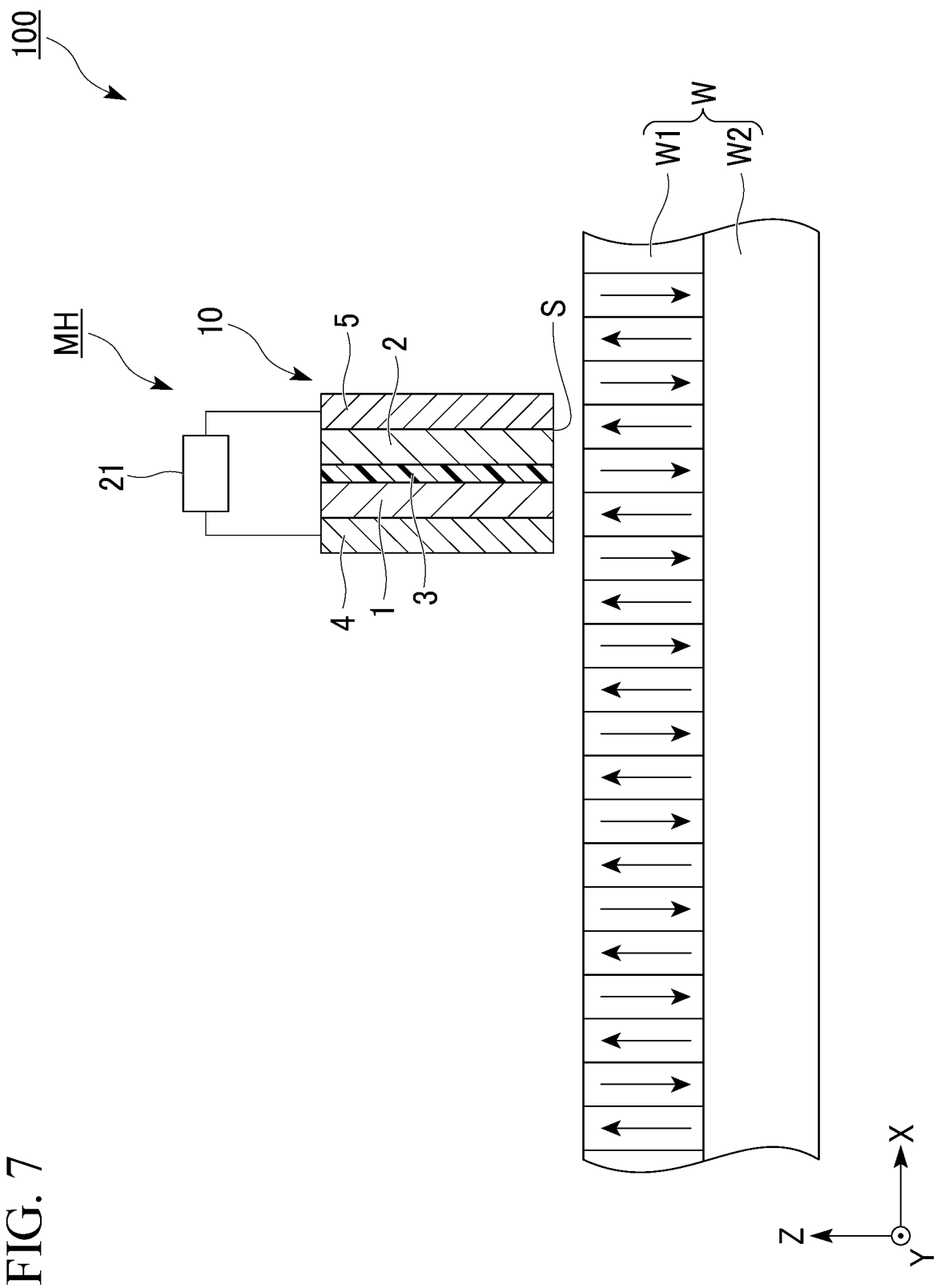
FIG. 7 is a cross-sectional view of a magnetic recording element according to Application Example 1.

FIG. 7 is a cross-sectional view of a magnetic recording element 100 according to Application Example 1. FIG. 7 is a cross-sectional view of the magnetic recording element 100 that is cut in a laminating direction.

As shown in FIG. 7, the magnetic recording element 100 has a magnetic head MH and a magnetic recording medium W. In FIG. 7, a direction in which the magnetic recording medium W extends is referred to as an X direction, and a direction perpendicular to the X direction is referred to as a Y direction. An XY plane is parallel to a main surface of the magnetic recording medium W. A direction in which the magnetic recording medium W and the magnetic head MH are connected and perpendicular to the XY plane is referred to as a Z direction.

The magnetic head MH has an air bearing surface (a medium-facing surface) S that faces a surface of the magnetic recording medium W. The magnetic head MH moves in directions of an arrow +X and an arrow −X along the surface of the magnetic recording medium W at a position separated from the magnetic recording medium W by a fixed distance. The magnetic head MH has the magnetoresistive effect element 10 serving as a magnetic sensor, and a magnetic recording section (not shown). A resistance measuring instrument 21 measures a resistance value of the magnetoresistive effect element 10 in the laminating direction.

The magnetic recording section applies a magnetic field to a recording layer W1 of the magnetic recording medium W, and determines an orientation of the magnetization of the recording layer W1. That is, the magnetic recording section performs magnetic recording of the magnetic recording medium W. The magnetoresistive effect element 10 reads information of the magnetization of the recording layer W1 written by the magnetic recording section.

The magnetic recording medium W has the recording layer W1 and a protective layer W2. The recording layer W1 is a portion that performs magnetic recording, and the protective layer W2 is a magnetic path (a passage of a magnetic flux) configured to reflux a magnetic flux for writing to the magnetic head MH again. The recording layer W1 records magnetic information as an orientation of the magnetization.

The second ferromagnetic layer 2 of the magnetoresistive effect element 10 is, for example, a magnetization free layer. For this reason, the second ferromagnetic layer 2 exposed to an air bearing surface S is affected by the magnetization recorded on the recording layer W1 of the facing magnetic recording medium W. For example, in FIG. 7, under the influence of the magnetization directed in the +z direction of the recording layer W1, an orientation of the magnetization of the second ferromagnetic layer 2 is directed in the +z direction. In this case, orientations of the magnetizations of the first ferromagnetic layer 1 and the second ferromagnetic layer 2, which are magnetization-fixed layers, are parallel to each other.

Here, the resistance when the orientations of the magnetizations of the first ferromagnetic layer 1 and the second ferromagnetic layer 2 are parallel to each other is different from the resistance when the orientations of the magnetizations of the first ferromagnetic layer 1 and the second ferromagnetic layer 2 are anti-parallel to each other. As a difference between the resistance value when parallel and the resistance value when anti-parallel is increased, the MR ratio of the magnetoresistive effect element 10 is increased. The magnetoresistive effect element 10 according to the embodiment contains the crystallized Heusler alloy and has a large MR ratio. Accordingly, the information of the magnetization of the recording layer W1 can be accurately read as a variation in resistance value by the resistance measuring instrument 21.

A shape of the magnetoresistive effect element 10 of the magnetic head MH is not particularly limited. For example, in order to avoid an influence on a leaked magnetic field of the magnetic recording medium W with respect to the first ferromagnetic layer 1 of the magnetoresistive effect element 10, the first ferromagnetic layer 1 may be placed at a position away from the magnetic recording medium W.

Figure 8:
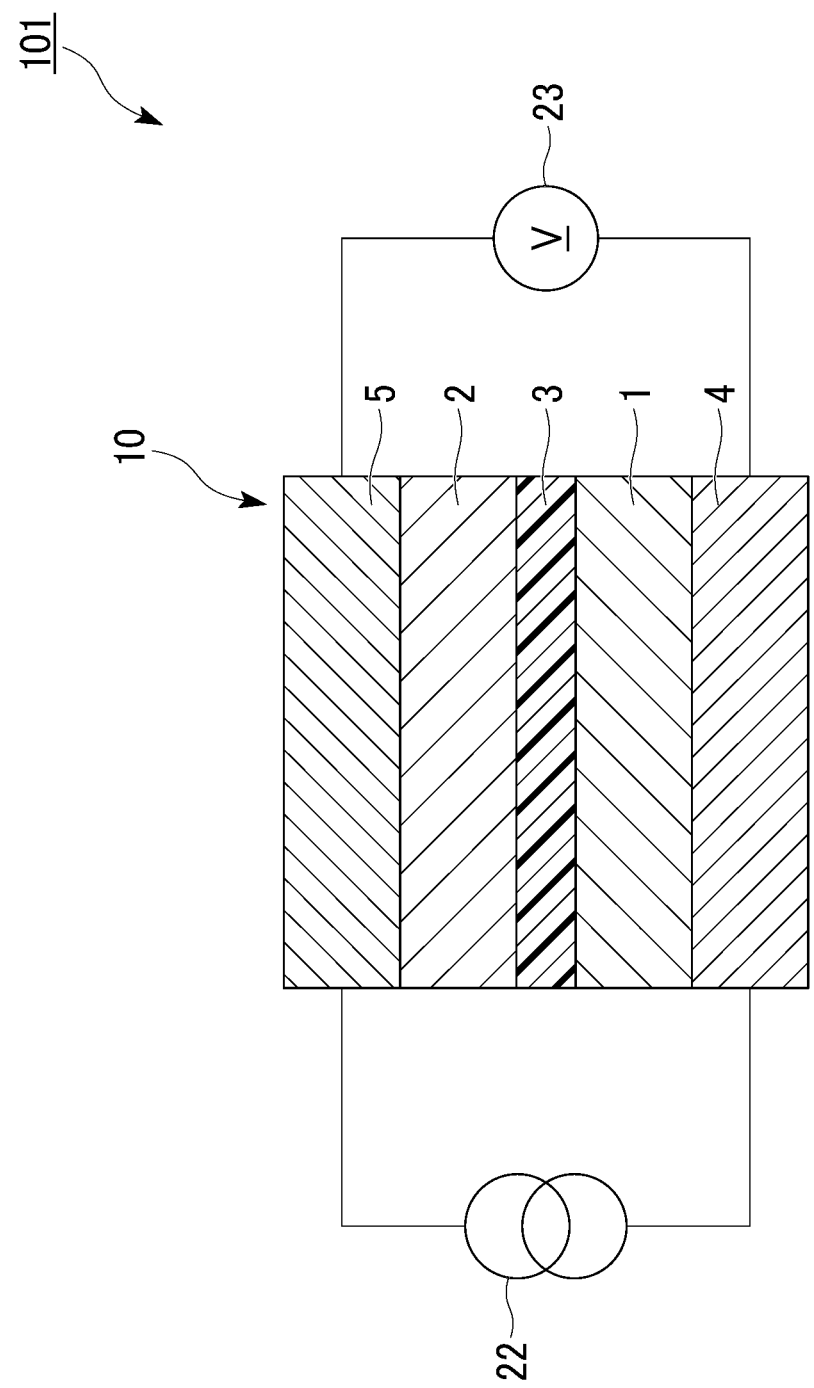
FIG. 8 is a cross-sectional view of a magnetic recording element according to Application Example 2.

FIG. 8 is a cross-sectional view of a magnetic recording element 101 according to Application Example 2. FIG. 8 is a cross-sectional view in which the magnetic recording element 101 is cut in the laminating direction.

As shown in FIG. 8, the magnetic recording element 101 has the magnetoresistive effect element 10, a power supply 22 and a measurement part 23. The power supply 22 provides a potential difference in the laminating direction of the magnetoresistive effect element 10. The power supply 22 is, for example, a direct current power supply. The measurement part 23 measures a resistance value of the magnetoresistive effect element 10 in the laminating direction.

When a potential difference between the first ferromagnetic layer 1 and the second ferromagnetic layer 2 is generated due to the power supply 22, current flows in the laminating direction of the magnetoresistive effect element 10. The current is spin-polarized when passing through the first ferromagnetic layer 1, and becomes spin polarization current. The spin polarization current reaches the second ferromagnetic layer 2 via the non-magnetic layer 3. The magnetization of the second ferromagnetic layer 2 is inverted by receiving a spin transfer torque (STT) due to the spin polarization current. Since a relative angle between the orientation of the magnetization of the first ferromagnetic layer 1 and the orientation of the magnetization of the second ferromagnetic layer 2 is varied, a resistance value of the magnetoresistive effect element 10 in the laminating direction is varied. The resistance value of the magnetoresistive effect element 10 in the laminating direction is read by the measurement part 23. That is, the magnetic recording element 101 shown in FIG. 8 is a spin transfer torque (STT) type magnetic recording element.

Since the magnetic recording element 101 shown in FIG. 8 including the magnetoresistive effect element 10 containing the crystallized Heusler alloy and having a large MR ratio, data can be accurately recorded.

Figure 9:
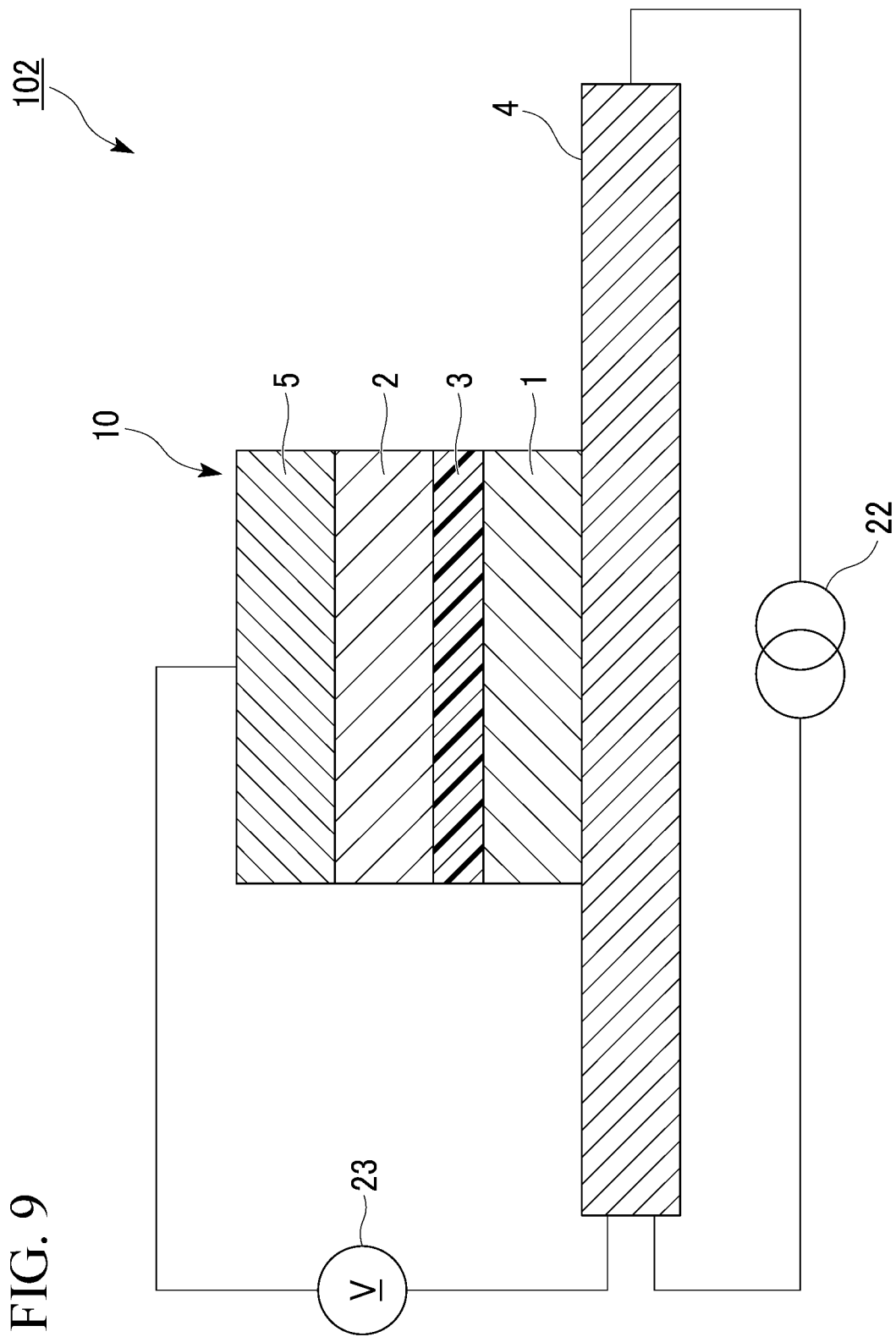
FIG. 9 is a cross-sectional view of a magnetic recording element according to Application Example 3.

FIG. 9 is a cross-sectional view of a magnetic recording element 102 according to Application Example 3. FIG. 9 is a cross-sectional view in which the magnetic recording element 102 is cut in the laminating direction.

As shown in FIG. 9, the magnetic recording element 102 has the magnetoresistive effect element 10, the power supply 22 and the measurement part 23. A connecting method of the power supply 22 is different from that of the magnetic recording element 101 shown in FIG. 8. The power supply 22 applies current between a first end and a second end of the additive-containing layer 4 that sandwich the magnetoresistive effect element 10 when seen in a plan view.

When a potential difference between the first end and the second end of the additive-containing layer 4 is generated by the power supply 22, current flows in the in-plane direction of the additive-containing layer 4. The additive-containing layer 4 has a function of generating spin current due to the spin Hall effect when the current flows. When the current flows in the in-plane direction of the additive-containing layer 4, the spin Hall effect is generated due to interaction of spin trajectories. The spin Hall effect is a phenomenon in which a moving spin is curved in a direction perpendicular to the flowing direction of the current. The spin Hall effect generates uneven distribution of the spins in the additive-containing layer 4, and induces the spin current in the thickness direction of the additive-containing layer 4. The spins are injected from the additive-containing layer 4 into the first ferromagnetic layer 1 by the spin current.

The spins injected into the first ferromagnetic layer 1 provide a spin orbital torque (SOT) to the magnetization of the first ferromagnetic layer 1. The magnetization of the first ferromagnetic layer 1 is inverted by receiving the spin orbital torque (SOT). In this case, the first ferromagnetic layer 1 becomes a magnetization free layer, and the second ferromagnetic layer 2 becomes a magnetization-fixed layer. Since the orientation of the magnetization of the first ferromagnetic layer 1 and the orientation of the magnetization of the second ferromagnetic layer 2 are varied, the resistance value of the magnetoresistive effect element 10 in the laminating direction is varied. The resistance value of the magnetoresistive effect element 10 in the laminating direction is read by the measurement part 23. That is, the magnetic recording element 102 shown in FIG. 9 is a spin orbital torque (SOT) type magnetic recording element.

Since the magnetic recording element 102 shown in FIG. 9 includes the magnetoresistive effect element 10 containing the crystallized Heusler alloy and having a large MR ratio, data can be accurately recorded.

In addition, while the magnetic recording element 102 shown in FIG. 9 shows the configuration in which the additive-containing layer 4 functions as wiring, a separate wiring may be provided on a surface of the additive-containing layer 4 opposite to the first ferromagnetic layer 1. In this case, the wiring contains any one of a metal, an alloy, intermetallic compound, metal boride, metal carbide, metal silicide, and metal phosphide having a function of generating a spin current due to a spin Hall effect when current flows. For example, the wiring contains a non-magnetic metal having an atomic number equal to or greater than an atomic number of 39 having a d electron or an f electron on the outermost shell.

Figure 10:
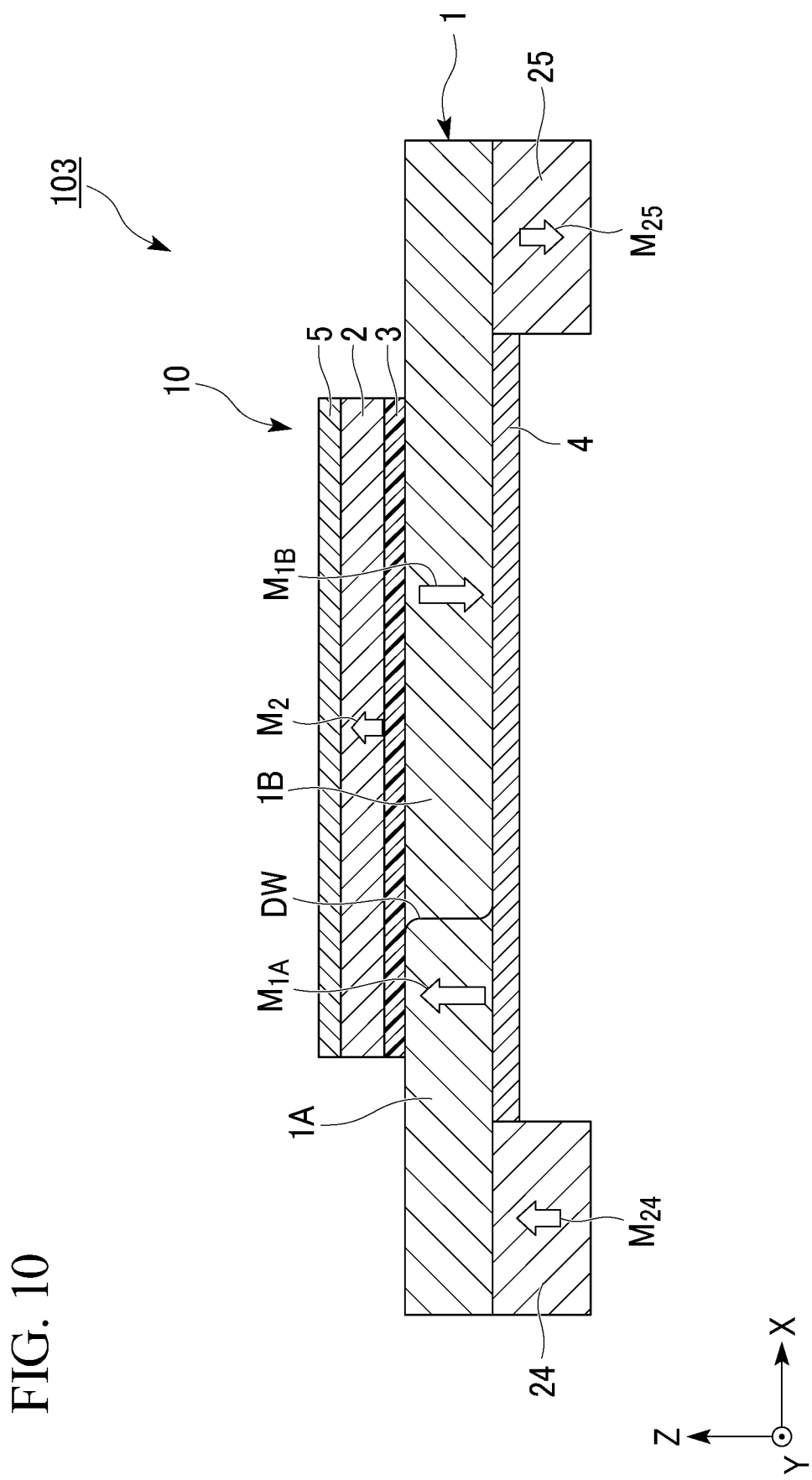
FIG. 10 is a cross-sectional view of a magnetic wall moving element according to Application Example 4.

FIG. 10 is a cross-sectional view of a magnetic wall moving element (a magnetic wall moving type magnetic recording element) according to Application Example 4.

A magnetic wall moving element 103 has the magnetoresistive effect element 10, a first magnetization-fixed layer 24 and a second magnetization-fixed layer 25. The magnetoresistive effect element 10 is constituted by the first ferromagnetic layer 1, the second ferromagnetic layer 2, the non-magnetic layer 3, and the additive-containing layers 4 and 5. In FIG. 8, a direction in which the first ferromagnetic layer 1 extends is referred to as an X direction, a direction perpendicular to the X direction is referred to as a Y direction, and a direction perpendicular to an XY plane is referred to as a Z direction.

The first magnetization-fixed layer 24 and the second magnetization-fixed layer 25 are connected to a first end and a second end of the first ferromagnetic layer 1. The first end and the second end sandwich the second ferromagnetic layer 2 and the non-magnetic layer 3 in the X direction.

The first ferromagnetic layer 1 is a layer that enables magnetic recording of information according to a variation of a magnetic state therein. The first ferromagnetic layer 1 has a first magnetic domain 1A and a second magnetic domain 1B therein. The magnetization of the position overlapping the first magnetization-fixed layer 24 or the second magnetization-fixed layer 25 of the first ferromagnetic layer 1 in the Z direction is fixed in one direction. The magnetization at the position overlapping the first magnetization-fixed layer 24 in the Z direction is fixed in, for example, the +Z direction, and the magnetization at the position overlapping the second magnetization-fixed layer 25 in the Z direction is fixed in, for example, the −Z direction. As a result, a magnetic domain wall DW is formed at a boundary between the first magnetic domain 1A and the second magnetic domain 1B. The first ferromagnetic layer 1 may have the magnetic domain wall DW therein. In the first ferromagnetic layer 1 shown in FIG. 10, magnetization $M_{1A}$ of the first magnetic domain 1A is oriented in the +Z direction, and magnetization $M_{1B}$ of the second magnetic domain 1B is oriented in the −Z direction.

The magnetic wall moving element 103 can record data in multiple values or continuously depending on the position of the magnetic domain wall DW of the first ferromagnetic layer 1. The data recorded on the first ferromagnetic layer 1 is read as a variation in resistance value of the magnetic wall moving element 103 when reading current is applied.

A ratio between the first magnetic domain 1A and the second magnetic domain 1B in the first ferromagnetic layer 1 is varied when the magnetic domain wall DW is moved. Magnetization $M_2$ of the second ferromagnetic layer 2 is the same direction (parallel to) as, for example, the magnetization $M_{1A}$ of the first magnetic domain 1A, and a direction opposite to the magnetization $M_{1B}$ of the second magnetic domain 1B (anti-parallel). When the magnetic domain wall DW is moved in the +X direction and the area of the first magnetic domain 1A in the portion overlapping the second ferromagnetic layer 2 when seen in a plan view from the Z direction is widened, the resistance value of the magnetic wall moving element 103 is reduced. On the contrary, when the magnetic domain wall DW is moved in the −X direction and the area of the second magnetic domain 1B in the portion overlapping the second ferromagnetic layer 2 when seen in a plan view from the Z direction is increased, the resistance value of the magnetic wall moving element 103 is increased.

The magnetic domain wall DW is moved by causing the writing current to flow in the X direction of the first ferromagnetic layer 1 and applying an external magnetic field. For example, when the writing current (for example, a current pulse) is applied in the +X direction of the first ferromagnetic layer 1, since the electrons flows in the −X direction opposite to the current, the magnetic domain wall DW moves in the −X direction. When the current flows from the first magnetic domain 1A toward the second magnetic domain 1B, the spin-polarized electrons in the second magnetic domain 1B inverts the magnetization $M_{1A}$ of the first magnetic domain 1A. Since the magnetization $M_{1A}$ of the first magnetic domain 1A is inverted, the magnetic domain wall DW is moved in the −X direction.

Since the magnetic wall moving element 103 shown in FIG. 10 includes the magnetoresistive effect element 10 containing the crystallized Heusler alloy and having a large MR ratio, data can be accurately recorded.

Figure 11:
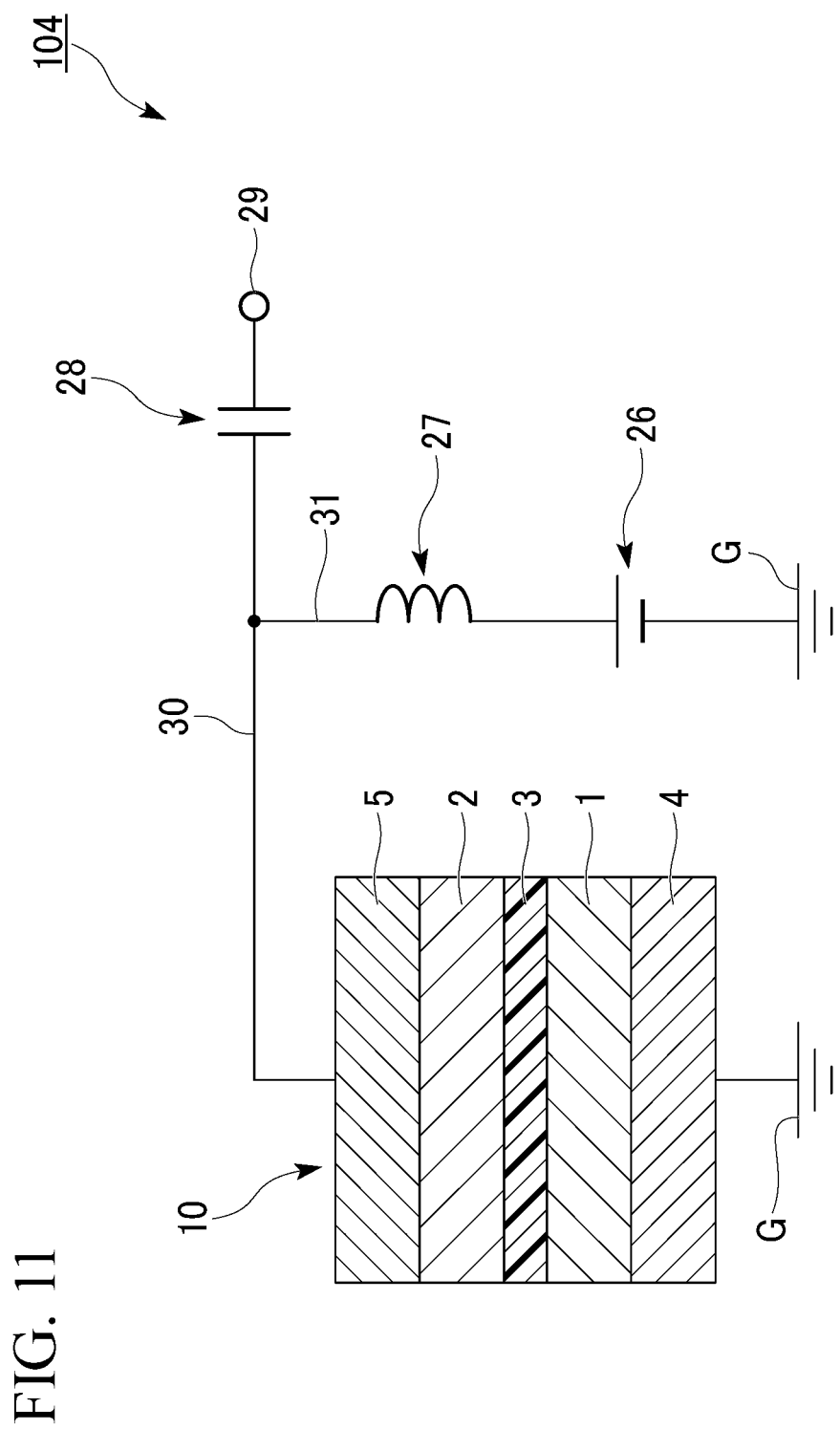
FIG. 11 is a schematic diagram of a high frequency device according to Application Example 5.

FIG. 11 is a schematic diagram of a high frequency device 104 according to Application Example 5. As shown in FIG. 11, the high frequency device 104 has the magnetoresistive effect element 10, a direct current power supply 26, an inductor 27, a capacitor 28, an output port 29, and wirings 30 and 31.

The wiring 30 connects the magnetoresistive effect element 10 and the output port 29. The wiring 31 is branched off from the wiring 30, and reaches a ground G via the inductor 27 and the direct current power supply 26. The direct current power supply 26, the inductor 27 and the capacitor 28, which are known, can be used. The inductor 27 cuts a high frequency component of the current, and passes through an unchangeable component of the current. The capacitor 28 passes through the high frequency component of the current, and cuts the unchangeable component of the current. The inductor 27 is disposed in a portion in which a flow of a high frequency current is minimized, and the capacitor 28 is disposed in a portion in which a flow of a direct current is minimized.

When an alternating current or an alternating current magnetic field is applied to a ferromagnetic layer included in the magnetoresistive effect element 10, the magnetization of the second ferromagnetic layer 2 is precessed. The magnetization of the second ferromagnetic layer 2 vibrates strongly when the frequency of the high frequency current or the high frequency magnetic field applied to the second ferromagnetic layer 2 is close to the ferromagnetic resonance frequency of the second ferromagnetic layer 2, and does not vibrate very much at the frequency separated from the ferromagnetic resonance frequency of the second ferromagnetic layer 2. The phenomenon is referred to as a ferromagnetic resonance phenomenon.

The resistance value of the magnetoresistive effect element 10 is varied due to vibrations of the magnetization of the second ferromagnetic layer 2. The direct current power supply 26 applies the direct current to the magnetoresistive effect element 10. The direct current flows in the laminating direction of the magnetoresistive effect element 10. The direct current flows to the ground G through the wirings 30 and 31, and the magnetoresistive effect element 10. A potential of the magnetoresistive effect element 10 is varied according to an Ohm's law. A high frequency signal is output from the output port 29 according to a variation in potential (a variation in resistance value) of the magnetoresistive effect element 10.

Since the high frequency device 104 shown in FIG. 11 includes the magnetoresistive effect element 10 containing the crystallized Heusler alloy and having a large variation width of the resistance value, a high frequency signal having a large output can be transmitted.

Example 1

In Example 1, the magnetoresistive effect element having the configuration shown in FIG. 1 has been fabricated. When the magnetoresistive effect element is fabricated, the element was annealed at 300° C. The configuration of each layer is as follows.

First ferromagnetic layer 1: $(Co_{2.0}Fe_{1.0}Ga_{0.5}Ge_{1.0})_{0.85}B_{0.15}$ Second ferromagnetic layer 2: $(Co_{2.0}Fe_{1.0}Ga_{0.5}Ge_{1.0})_{0.85}B_{0.15}$ Non-magnetic layer 3: Ag Additive-containing layers 4 and 5: TaB The substrate Sub was a thermal oxide film-attached Si substrate.

In addition, it was checked from a transmission electron microscope (TEM) image that the first ferromagnetic layer 1 and the second ferromagnetic layer 2 are crystallized.

The MR ratio (a magnetoresistive change ratio) of magnetoresistive effect element of Example 1 was measured. The MR ratio of Example 1 was 18.5%.

Estimation of the MR ratio was performed in the following sequence. First, a shape appropriate for measurement was formed using a fine processing technology such as EB lithography, ion milling, or the like. In a state in which a fixed current flows in the laminating direction of the magnetoresistive effect element 10, a variation in resistance value of the magnetoresistive effect element 10 was measured by monitoring an application voltage to the magnetoresistive effect element 10 using a voltmeter while returning the magnetic field to the magnetoresistive effect element 10 from the outside. The resistance value when the orientations of the magnetizations of the first ferromagnetic layer 1 and the second ferromagnetic layer 2 are parallel to each other and the resistance value when the orientations of the magnetizations of the first ferromagnetic layer 1 and the second ferromagnetic layer 2 are anti-parallel to each other was measured, and the following equation was calculated from the obtained resistance value. Measurement of the MR ratio was performed at 300 K (a room temperature).

$$MR \text{ ratio } (\%) = (R_{AP} - R_P)/R_P \times 100$$

$R_P$ is a resistance value when the orientations of the magnetizations of the first ferromagnetic layer 1 and the second ferromagnetic layer 2 are parallel to each other, and $R_{AP}$ is a resistance value when the orientations of the magnetizations of the first ferromagnetic layer 1 and the second ferromagnetic layer 2 are anti-parallel to each other.

Examples 2 to 6

Examples 2 to 6 are distinguished from Example 1 in that a composition ratio of germanium of the first ferromagnetic layer 1 and the second ferromagnetic layer 2 is changed. The other conditions are similar to those of Example 1, and the MR ratio of the magnetoresistive effect element was measured.

Comparative Example 1

Comparative example 1 is distinguished from Example 2 in that the first ferromagnetic layer 1 and the second ferromagnetic layer 2 do not contain boron. The other conditions are similar to those of Example 2, and the MR ratio of the magnetoresistive effect element was measured.

TABLE 1

| Element | Co | Fe | Ga | Ge | | B | MR |
|---|---|---|---|---|---|---|---|
| Composition ratio | α | β | γ | | β + γ | δ | |
| Comparative Example 1 | 2 | 1 | 0.5 | 0.6 | 2.1 | — | 1.9 |
| Example 2 | 2 | 1 | 0.5 | 0.6 | 2.1 | 0.15 | 5.3 |
| Example 3 | 2 | 1 | 0.5 | 0.8 | 2.3 | 0.15 | 14.5 |
| Example 1 | 2 | 1 | 0.5 | 1 | 2.5 | 0.15 | 18.5 |
| Example 4 | 2 | 1 | 0.5 | 1.2 | 2.7 | 0.15 | 17.2 |
| Example 5 | 2 | 1 | 0.5 | 1.4 | 2.9 | 0.15 | 15.6 |
| Example 6 | 2 | 1 | 0.5 | 1.6 | 3.1 | 0.15 | 6.2 |

The above-mentioned Table 1 summarizes the results of Examples 1 to 6 and Comparative example 1. In Comparative example 1, the MR ratio was lower than those of Examples 1 to 6. It is considered that this is because the first ferromagnetic layer 1 and the second ferromagnetic layer 2 did not contain boron, and rearrangement of atoms according to movement of boron did not occur at the time of annealing.

Examples 7 to 12

Examples 7 to 12 are distinguished from Example 1 in that the composition ratio of boron of the first ferromagnetic layer 1 and the second ferromagnetic layer 2 is changed. The other conditions are similar to Example 1, and the MR ratio of the magnetoresistive effect element was measured.

Comparative Example 2

The Comparative example 2 is distinguished from Example 1 in that the first ferromagnetic layer 1 and the second ferromagnetic layer 2 did not contain boron. The other conditions are similar to Example 1, and the MR ratio of the magnetoresistive effect element was measured.

TABLE 2

| Element | Co | Fe | Ga | Ge | | B | MR |
|---|---|---|---|---|---|---|---|
| Composition ratio | α | β | γ | | β + γ | δ | |
| Comparative Example 2 | 2 | 1 | 0.5 | 1 | 2.5 | 0 | 2.5 |
| Example 7 | 2 | 1 | 0.5 | 1 | 2.5 | 0.05 | 8.3 |
| Example 8 | 2 | 1 | 0.5 | 1 | 2.5 | 0.1 | 15.5 |
| Example 1 | 2 | 1 | 0.5 | 1 | 2.5 | 0.15 | 18.5 |
| Example 9 | 2 | 1 | 0.5 | 1 | 2.5 | 0.2 | 18.9 |
| Example 10 | 2 | 1 | 0.5 | 1 | 2.5 | 0.25 | 16.2 |
| Example 11 | 2 | 1 | 0.5 | 1 | 2.5 | 0.3 | 13.4 |
| Example 12 | 2 | 1 | 0.5 | 1 | 2.5 | 0.35 | 5.7 |

The above-mentioned Table 2 summarizes the results of Example 1, Examples 7 to 12 and Comparative example 2. In Comparative example 2, the MR ratio was lower than those of Example 1 and Examples 7 to 12. It is considered that this is because the first ferromagnetic layer 1 and the second ferromagnetic layer 2 did not contain boron, and rearrangement of atoms according to movement of boron did not occur at the time of annealing.

REFERENCE SIGNS LIST

1 First ferromagnetic layer
1a, 2a First surface
1b, 2b Second surface
1A First magnetic domain
1B Second magnetic domain
2 Second ferromagnetic layer
3, 13 Non-magnetic layer
4, 5 Additive-containing layer
10, 10A Magnetoresistive effect element
11, 12 Ferromagnetic layer
14, 15 Absorber layer
21 Resistance measuring instrument
22 Power supply
23 Measurement part
24 First magnetization-fixed layer
25 Second magnetization-fixed layer
26 Direct current power supply
27 Inductor
28 Capacitor
29 Output port
30, 31 Wiring
100, 101, 102 Magnetic recording element
103 Magnetic wall moving element
104 High frequency device
DW Magnetic domain wall
Sub Substrate

What is claimed is:

1. A magnetoresistive effect element comprising: a first ferromagnetic layer, a second ferromagnetic layer, a non-magnetic layer disposed between the first ferromagnetic layer and the second ferromagnetic layer, an intermediate layer, and an additive-containing layer disposed at any position in a laminating direction,
wherein at least one of the first ferromagnetic layer and the second ferromagnetic layer is a Heusler alloy containing at least one of boron and carbon, at least part of which is crystallized, and
the additive-containing layer is a non-magnetic layer containing both boron and carbon, and Ru.

2. The magnetoresistive effect element according to claim 1, wherein the additive-containing layer is two layers, and the two additive-containing layers sandwich the first ferromagnetic layer and the second ferromagnetic layer.

3. The magnetoresistive effect element according to claim 1, wherein the additive-containing layer is in contact with at least one of the first ferromagnetic layer and the second ferromagnetic layer.

4. The magnetoresistive effect element according to claim 1, wherein, in the first ferromagnetic layer or the second ferromagnetic layer, a concentration of boron or carbon in a first surface close to the non-magnetic layer is lower than a concentration of boron or carbon in a second surface far from the non-magnetic layer.

5. The magnetoresistive effect element according to claim 1, wherein, in the first ferromagnetic layer or the second ferromagnetic layer, a concentration of boron or carbon is lower as it becomes closer to the non-magnetic layer.

6. The magnetoresistive effect element according to claim 1, wherein, in the Heusler alloy, a compound expressed by $Co_\alpha Y_\beta Z_\gamma$ contains at least one of boron and carbon,
Y is a transition metal element or a precious metal element of the Co, Fe, Ni, Cu, Mn, V, Cr or Ti group, and Z is a typical element from group III to group V, and
α is 1 or 2 and β+γ>2 is satisfied.

7. The magnetoresistive effect element according to claim 1, wherein the Heusler alloy is a compound expressed by $(Co_2Fe_\beta Z_\gamma)_{1-\delta}B_\delta$, Z is a typical element from group III to group V, and $\beta+\gamma \geq 2.3$, $\beta<\gamma$, $0.5<\beta<1.9$, $1.0<\gamma<2.0$, and $0.1\leq\delta\leq0.3$ are satisfied.

8. The magnetoresistive effect element according to claim 7, wherein the compound satisfies $0.1\leq\delta\leq0.25$.

9. The magnetoresistive effect element according to claim 1, wherein the additive-containing layer is discontinuous in an in-plane direction crossing the laminating direction.

10. The magnetoresistive effect element according to claim 1, wherein the non-magnetic layer is a metal or an alloy containing any one element selected from the group consisting of Cu, Au, Ag, Cr and Al.

11. The magnetoresistive effect element according to claim 1, further comprising an intermediate layer,
wherein the intermediate layer is disposed at least one of between the first ferromagnetic layer and the non-magnetic layer and between the second ferromagnetic layer and the non-magnetic layer,
the intermediate layer is an alloy expressed by Ni or $Ni_\varepsilon Al_{1-\varepsilon}$, and $0.5\leq\varepsilon<1.0$.

12. The magnetoresistive effect element according to claim 11, wherein a thickness of the intermediate layer is greater than 0 nm, and equal to or smaller than 0.63 nm.

13. The magnetoresistive effect element according to claim 1, further having a substrate,
wherein the substrate is a backing on which the first ferromagnetic layer, the second ferromagnetic layer, the non-magnetic layer and the additive-containing layer are laminated, and
the substrate is amorphous.

14. The magnetoresistive effect element according to claim 1, further comprising an intermediate layer,
wherein the intermediate layer is disposed at least one of between the first ferromagnetic layer and the non-magnetic layer and between the second ferromagnetic layer and the non-magnetic layer,
the intermediate layer is an alloy expressed by $Ni_\varepsilon Al_{1-\varepsilon}$, and
$0.5\leq\varepsilon<1.0$.

* * * * *